Aug. 28, 1956     O. F. PRASZ     2,760,448
FOLDABLE MOULD FOR AUTOMATIC CHOCOLATE MOULDING PLANTS
Filed March 14, 1955     2 Sheets-Sheet 1
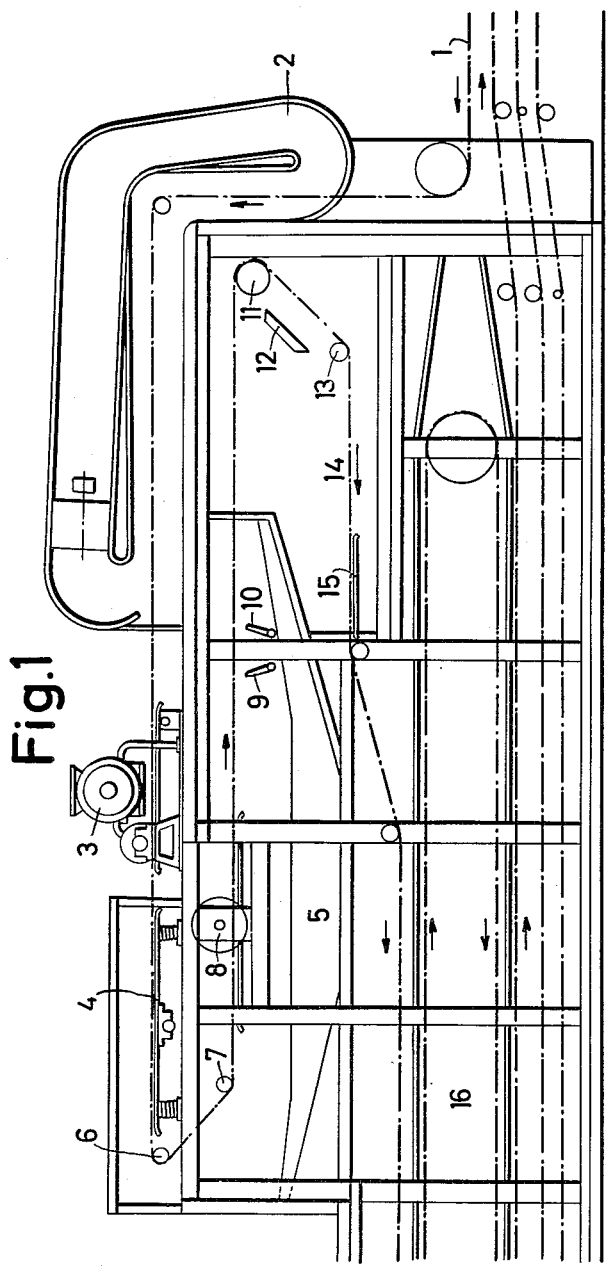
OVE F. PRASZ
INVENTOR
BY Wenderoth, Lind & Ponack
ATTORNEYS Aug. 28, 1956     O. F. PRASZ     2,760,448
FOLDABLE MOULD FOR AUTOMATIC CHOCOLATE MOULDING PLANTS
Filed March 14, 1955     2 Sheets-Sheet 2
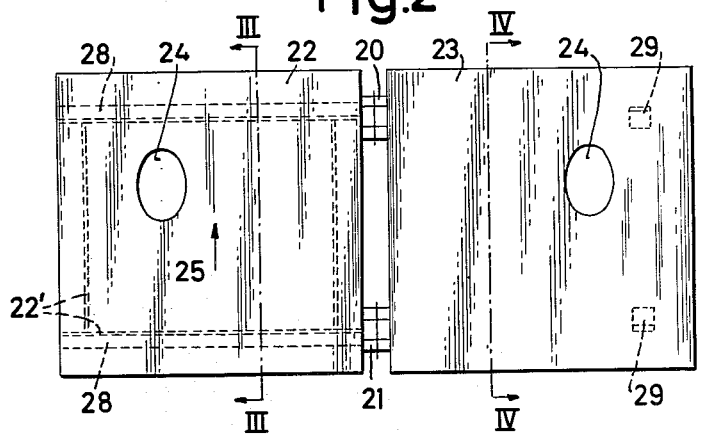
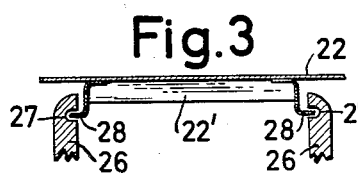
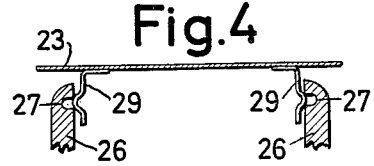
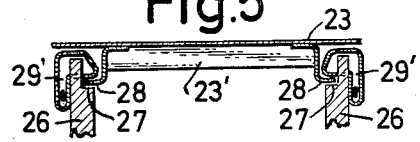
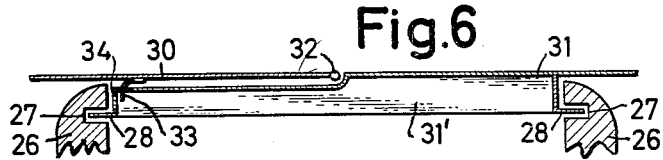
OVE F. PRASZ
INVENTOR
BY Wenderoth, Lind & Ponack
ATTORNEYS United States Patent Office 2,760,448
Patented Aug. 28, 1956

2,760,448

FOLDABLE MOULD FOR AUTOMATIC CHOCOLATE MOULDING PLANTS

Ove Franz Prasz, Gentofte, Denmark, assignor to Mikrovaerk A/S, Copenhagen-Soborg, Denmark Application March 14, 1955, Serial No. 494,124

Claims priority, application Denmark March 17, 1954

3 Claims. (Cl. 107—19)

In the manufacture of hollow chocolate articles it is known to make these of two shells which after having been removed from the mould can be assembled pairwise so as to form closed bodies. The assemblage may be effected by the edges of two corresponding shells being heated and next kept pressed against each other, until the sealing joint between the two shells has solidified sufficiently for ensuring a permanent connection between the shells. This assemblage and sealing together of two shells for the formation of a closed hollow article is performed manually and discontinuously which makes the manufacture rather expensive.

A certain reduction of the manual work may be attained by using loose or separate, foldable moulds each consisting of two interhinged mould sections for the simultaneous production, and subsequent assemblage, of two sets of pairwise corresponding shells, the said assemblage being effected by folding the mould so as to cause the upper sides of the mould sections to contact each other. In using such known moulds, the latter are first manually placed in an apparatus depositing chocolate mass into the mould cavities, whereupon the mould is turned upside down for discharging part of this mass. Next, the upper side of the mould is clean-scraped, and the mould is closed or folded and placed on a shaking table for the purpose of pairwise assemblage of the shells deposited in the mould cavities. After proper cooling the mould may be reopened for the removal of the finished articles. Also in this case it is obvious that many manipulations are required during the production.

By contrast, the present invention relates to a foldable mould for automatic chocolate moulding plants, particularly for manufacturing hollow articles, the said plant being of the known type having a number of mutually connected moulds, each consisting of two mould sections hingedly connected to each other and adapted to be closed with their upper sides against each other for the pairwise assemblage of the shells formed in the mould cavities of the mould sections. Such a full-automatic moulding plant for the production of hollow articles is known. In this known plant, each of the mould sections is provided with one or more mould cavities extending across the division joint between the two mould sections. The cavity or cavities having been filled with the moulding mass, the mould is closed by each of the two mould sections being swung 90° upwards on a joint axis laying at the division joint and flush with the upper sides of the mould sections. In this way the upper sides or top faces of the two mould sections are consequently caused to contact each other and at the same time the mould cavity of each of them is opened in a downward direction so that a substantial amount of the still liquid moulding mass pours out of the mould. Next, the closed mould passes over a shaking mechanism and through a cooling chamber whereupon it is re-opened automatically so that the article or articles can be removed or can automatically fall out of the mould. These articles are open at one end, and if closed articles be desired, this opening may be closed afterwards by sealing-on of a separately produced lid. Another drawback attached to this known plant is that special guiding rails are required for the closing and opening of the moulds which complicates the structure of the plant, and the moulds proper must be provided with rollers for engaging said rails. Further, the replacement of the moulds will usually be a rather complicated job.

These drawbacks have been remedied by the present invention in that one mould section of the mould is secured to a frame with holding rails for insertion into a pair of opposed grooves of one of a number of interchained mould carriers known per se, and that the other mould section from its normal position in which its upper side lies flush with the upper side of the first mould section is swingable through an angle of 180° in relation to said first mould section secured to the frame. Such moulds may easily be placed in, and removed from, the mould carriers so that the replacement of the moulds may be effected in comparatively short time, and another important advantage consists in that these moulds may be used in the hitherto known automatic chocolate moulding plants provided with mould carriers without, or substantially without, requiring any modifications in said plants. A cause contributing hereto is that no guide rails for keeping the mould in its closed position are required, and that only one of the two mould sections must be swung for the opening and closing of the mould.

In an advantageous embodiment of the invention the hinge axis between the two mould sections is parallel to the holding rails for said first mould section, and said other mould section is provided with resilient arresting means for releasably holding this mould section in its normal position. When the hinge axis is so situated the opening and closing of the mould will take place in a particularly simple manner, as the movable or swingable mould section need, by way of example, only possess laterally projecting pins or projections for engaging stationary guides during the travel of the mould through the plant.

According to the invention the hinge axis between the two mould sections may, however, also extend transversely of the holding rails for said first mould section, and the other mould section may be provided with resilient arresting means for releasably holding this mould section in its normal position by direct engagement with the corresponding mould carrier. In this embodiment the frame of the mould need only support the one mould section since the other mould section in its normal position is supported, at least in part, by the mould carrier proper.

Some embodiments of the invention will now be more fully described with reference to the drawings, on which Fig. 1 shows a longitudinal section through part of an embodiment of a plant, in which the mould, according to the invention may be used, Fig. 2 shows a plan view of a mould according to the invention, Fig. 3 shows a diagrammatical cross section on line III—III in Fig. 2, parts of the mould carrier of the mould being indicated, Fig. 4 shows a similar cross section on line IV—IV in Fig. 2, Fig. 5 shows a section similar to Fig. 4 of a modification of the swingable mould section and the adjacent parts of a mould carrier, and Fig. 6 shows a diagrammatical cross section on a larger scale through another mould according to the invention, likewise with indication of certain parts of a mould carrier therefor.

1 in Fig. 1 designates a so-called mould band consisting of a number of interlinked mould carriers for receiving replaceable moulds.

These mould carriers may be of known type and are, therefore, not shown in this figure. The travel of the mould band through the plant is indicated by a series of arrows.

The mould band 1 advances towards the plant from the right and passes first through a mould heater 2. Next the mould band passes an apparatus 3 for filling the mould cavities with the moulding mass and further on across a shaking table 4 intended for ensuring that air bubbles, if any, in the moulding mass are driven out.

Having passed the shaking table 4 the mould band travels over a pair of rollers 6 and 7, whereby the moulds are turned upside down. Hereby part of the contents of moulding mass of the mould cavities will be discharged into a tray 5, so that only a shell of moulding mass is left in each of the cavities. Over said tray 5 a shaking mechanism 8 may be provided, and over the right hand end of the tray a scraping mechanism is provided consisting of a fixed scraper or knife 9 which may be kept heated and serves for scraping off the greater part of the moulding mass adhering to the upper sides of the moulds, which now face downwards, and a succeeding extra scraper 10 serving for removing the remainder of the mass left by the knife 9.

During its further travel the mould band passes a roller 11 and next a heat source 12 which serves to heat the edges of the chocolate shells slightly.

Under a further guiding roller 13 the moulds now pass into the so-called closing station 14, where two corresponding mould sections are closed in such a way with their upper sides against each other that the chocolate shells located in the mould sections are assembled by twos with their edges against each other so as to form the hollow articles desired.

Via a shaking table 15, which is to ensure or further the sealing of the joined edges of the shells, the moulds now pass into a cooling chamber 16, in which the assembled mould sections, and consequently also the moulded bodies contained therein, are cooled. During this cooling there will be a certain contraction of the moulded bodies, and these will therefore be easy to remove from the mould cavities, after the two mould sections have once more been separated, which occurs after the passage through the cooling chamber 16.

As shown in Fig. 2, each of the moulds used in the plant may consist of two mould sections 22 and 23 of the same size which are connected with each other through hinges 20 and 21 and are provided with a number of pairwise corresponding mould cavities 24, only a single pair of which has been shown in the figure. These mould cavities lie symmetrically in relation to the vertical plane through the axis for the hinges 20 and 21. In Fig. 2, the direction of travel of the mould has been indicated by an arrow 25.

A mould like the one shown in Fig. 2 can be inserted in a mould carrier of the type provided with two opposed grooves for receiving holding rails on the mould. This has been illustrated in Figs. 3 and 4, in which 26 indicates parts of the mould carrier containing said grooves 27 which extend at right angles to the direction of travel of the mould band, 28 being holding rails forming part of a frame 22', Figs. 2 and 3, to which the mould section 22 is secured.

The mould section 23 has no holding rails like the rails 28 of the mould section 22, but carries instead on its underside a pair of resilient clips 29 which in the normal position of the mould section, i. e. in the position in which its upper side lies flush with the upper side of the mould section 22, in an easily releasable manner engage the grooves 27 of the mould carrier and thereby act as arresting members for holding the mould section 23 in said normal position. When the two mould sections are to be assembled at the closing station 14, Fig. 1, the resilient clips 29 can easily be released from the grooves 27, whereupon the mould section 13 can be swung 180° on the horizontal hinge axis, so that it is brought to rest with its upper side on the upper side of the mould section 22.

Fig. 5 shows an amended embodiment of the bipartite mould with the mould carrier therefor. The mould section 23 shown in Fig. 5 must be imagined hinged together with a mould section corresponding to the mould section 22 in Figs. 2 and 3 and is, like the latter, provided on its underside with a frame 23' with two holding rails 28 which can be received in grooves 27 in the corresponding mould carrier 26. The parts of the grooves 27 of the mould carrier belonging to this mould section 23 are, however, open upwardly, and until the mould arrives at the closing station 14, the holding rails 28 of the mould section 23 are secured in the upwardly open grooves 27 by means of arresting members in the form of pawls 29' carried swingably by the mould carrier 26.

While the hinge axis of the connection between the two mould sections 22 and 23 in Figs. 2 to 5 extends transversely to the holding rails 28 and thus is parallel to the arrow 25, Fig. 6 shows a mould likewise consisting of two mould sections 30 and 31 interlinked through a hinge connection 32, but the axis of this hinge is parallel to the holding rails 28 on the supporting frame 31' of the mould section 31 and thus perpendicular to the direction of travel of the mould.

The other mould section 30 is provided with resilient arresting members 33 for releasably holding this mould section in its normal position, i. e. the position shown in Fig. 6, by engagement with a portion 34 of the frame 31'.

I claim:

1. For use in automatic confectionery shell moulding plants of the type comprising a series of travelling interchained mould carriers each having a pair of grooves extending transversely to the direction of travel, for receiving holding rails of a mould carrying frame, a foldable mould carried on said mould carrying frame comprising a first mould section, and a second mould section hingedly connected thereto, said first mould section being rigidly secured to said holding rails and said hingedly connected second mould section being swingable from its normal position in which its top face is flush with that of said first mould section, through an angle of 180° into a position in which its top face rests upon the top face of said first mould section.

2. A foldable mould as claimed in claim 1, wherein the said hinge connection between said first and said second mould section has an axis which extends parallel to said holding rails, said second mould section being provided with arresting means for releasable engagement with said frame when said second mould section is in its normal position.

3. A foldable mould as claimed in claim 1, wherein the said hinge connection between said first and said second mould section has an axis which extends transversely to said holding rails, said second mould section being provided with arresting means for releasable engagement with said grooves when said second mould section is in its normal position.

References Cited in the file of this patent

UNITED STATES PATENTS

| | | |
|---|---|---|
| Re. 16,788 | Baier | Nov. 22, 1927 |
| 1,812,242 | Jensen | June 30, 1931 |

FOREIGN PATENTS

| | | |
|---|---|---|
| 430,295 | Italy | Feb. 12, 1948 |
| 621,328 | Germany | Nov. 5, 1935 |